United States Patent [19]

Koucky et al.

[11] 4,248,480
[45] Feb. 3, 1981

[54] LOCKING RAIL SUPPORTED ON FIXED VEHICLE PART

[75] Inventors: Antonin Koucky; Rolf Krügener, both of Sindelfingen, Fed. Rep. of Germany

[73] Assignee: Daimler-Benz Aktiengesellschaft, Fed. Rep. of Germany

[21] Appl. No.: 49,873

[22] Filed: Jun. 19, 1979

[30] Foreign Application Priority Data

Jun. 19, 1978 [DE] Fed. Rep. of Germany ....... 2826634

[51] Int. Cl.³ .................. A62B 35/00; A47C 31/00
[52] U.S. Cl. .................. 297/473; 248/393; 296/65 R; 297/216; 297/468
[58] Field of Search .............. 297/473, 216, 468, 485; 248/394, 393, 395, 396; 296/65 R

[56] References Cited

U.S. PATENT DOCUMENTS

| 3,737,197 | 6/1973 | Hall et al. | 297/468 |
| 3,746,393 | 7/1973 | Andres et al. | 297/468 |
| 3,811,727 | 5/1974 | Rumpel | 297/468 |

FOREIGN PATENT DOCUMENTS 2106960  5/1972  France .................. 297/468

Primary Examiner—James T. McCall
Attorney, Agent, or Firm—Craig & Antonelli

[57] ABSTRACT

A locking rail supported on a fixed vehicle part for a lever pivotally connected to a seat frame of a longitudinally and vertically adjustable automobile seat. The lever receives one end of a safety belt system with a lower free end of the lever lockingly engaging the locking rail when a predetermined tensile stress on the belt strap is exceeded. The locking rail is rigidly attached to parts fixed to the vehicle such as, for example, the seat underframe and the vehicle floor. The lever is connected to the seat frame by way of a fishplate which is mounted on both sides in an articulated fashion.

3 Claims, 1 Drawing Figure

U.S. Patent  Feb. 3, 1981  4,248,480
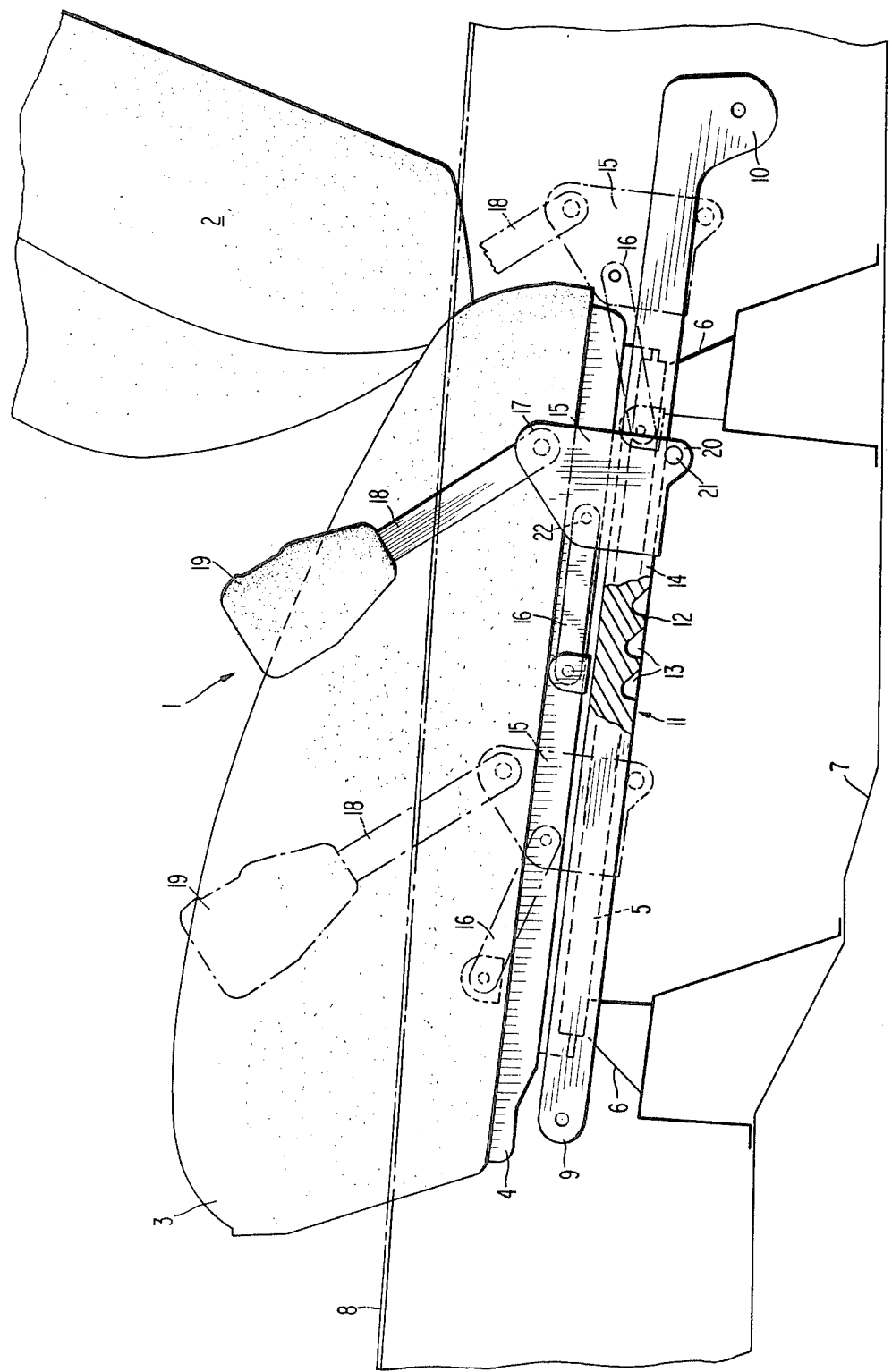

LOCKING RAIL SUPPORTED ON FIXED VEHICLE PART

The present invention relates to a rail construction and, more particularly, to a locking ratchet or index rail arrangement resting on a fixed vehicle part with a lever being pivotally connected to a seat frame of a longitudinally and vertically adjustable automobile seat which lever receives at one end thereof a portion of the safety belt system with a lower free end of the lever being lockably engageable with the locking rail when a predetermined tensile stress of the safety belt strap is exceeded.

In Offenlegungsschrift No. 26 34 218, a locking rail arrangement is used with vertically adjustable seats by pivotally supporting a rear end of the locking rail at a fixed vehicle part.

One disadvantage of this proposed construction resides in the fact that, especially with a rather extensive vertical adjusting motion of the seat, the locking rail is placed into an extreme position due to its positive entrainment by the lever, which at least partially surrounds the locking rail, so that a free end of the rail projects beyond the central vehicle tunnel and/or the storage tray arranged at that location and, consequently, in addition to restricting the available space in this zone, also leads to endangering of the occupants of the vehicle.

A further disadvantage of this proposed construction resides in the fact that, in case of a change in the seat level, the belt latch connected to the lever moves along a circular arc so that the course of the belt strap is likewise altered which, in many cases, can be very troublesome.

The aim underlying the present invention essentially resides in providing a locking rail arrangement for vehicle seats which is readily useable with seats which are not only longitudinally adjustable but which are also greatly variably adjustable with respect to the height of the vehicle seat.

In accordance with advantageous features of the present invention, the locking rail is supported on a fixed vehicle part with a lever being pivotally connected to the seat frame of a longitudinally and vertically adjustable automobile seat which lever receives one end of a safety belt system with a lower free end of the lever being adapted to lockingly engage the locking rail when a predetermined tensile force on the safety belt strap has been exceeded.

In accordance with the present invention, the locking rail is rigidly mounted to support parts fixed to the vehicles such as the seat underframe and the vehicle floor and the lever is connected to the seat frame by way of a fishplate which is mounted on both sides thereof in an articulated fashion.

Advantageously, according to the present invention, the locking rail may be constructed so as to form one structural unit with the seat underframe.

Accordingly, it is an object of the present invention to provide a locking rail for a vehicle seat which avoids, by simple means, shortcomings and disadvantages encountered in the prior art.

Another object of the present invention resides in providing a locking rail for a vehicle seat which satisfies all requirements with respect to adjustability, comfort, and safety.

A further object of the present invention resides in providing a locking rail arrangement which insures the locking of a vehicle seat in position upon the occurrence of a predetermined deceleration of the vehicle resulting in the application of a predetermined tensile force on a safety belt of the vehicle without any special expenditures.

Yet another object of the present invention resides in providing a locking rail for a vehicle seat which is simple in construction and, therefore, relatively inexpensive to manufacture.

A still further object of the present invention resides in providing a locking rail for a vehicle seat which functions reliably under all operating conditions.

These and other objects, features, and advantages of the present invention will become more apparent from the following description when taken in connection with the accompanying drawing which shows, for the purposes of illustration only, one embodiment in accordance with the present invention, and wherein the single FIGURE is a partially-schematic side view of a locking rail arrangement for a vehicle seat in accordance with the present invention.

Referring now to the single FIGURE of the drawing, according to this FIGURE, an automobile seat 1 includes a seat back 2, seat cushion 3, and a seat frame 4. A longitudinal and vertical adjustment mechanism, not shown in detail for the sake of clarity, rests by way of a seat underframe 5 on support members 6 fixed to and projecting from a vehicle floor 7.

A locking rail generally designated by the reference numeral 11 is attached at its respective ends 9, 10 to a central tunnel 8 indicated in dot-dash lines, with the central tunnel 8 being formed as a part of the vehicle floor 7 and covering, for example, a vehicle drive shaft, vehicle transmission, or the like. The locking rail 11 is provided with a row of teeth 13 along a lower narrow side 12 thereof with a deformable material such as, for example, a hose 14 being placed flat on the row of teeth 13 during a normal driving operation.

A lever 15 at least partially surrounds the locking rail 11 and is pivotally connected to the seat frame 4 by a fishplate 16. A vehicle safety belt guide 18 is pivotally mounted at an upper end 17 of the lever 15 with a belt lock 19 being connected to the other end of the belt guide 18. A pin 21 is disposed in a lower free end 20 of the lever 15 with the pin 21 being adapted to impress itself into the hose 14 and engage one of the teeth 13 so as to effect a locking action with the locking rail 11 when a predetermined tensile force effective on a vehicle safety belt (not shown) the end of which is accommodated in the belt lock 19 is exceeded. During this locking action, the lever 15 executes a pivoting motion about the point of articulation 22 of the fishplate 16.

In the illustrated embodiment, the locking rail 11 is arranged so as to extend in the longitudinal adjusting direction of the seat 1, that is, parallel to the longitudinal axis of the vehicle whereby a longitudinal adjustment results in the fishplate 16 being maintained in the position shown in full lines in the drawing over the entire longitudinal adjusting path. However, with a change in the height of the seat 1, by, for example, the vertical adjustment mechanism, then there is a change in the distance between the seat underframe 5 and seat frame 4 which change is communicated to the fishplate 16 such that the fishplate assumes the position indicated in dot-dash lines in the drawing. The associated vertical repositioning of the belt lock or latch 19 is within acceptable limits during the height adjusting process.

While we have shown and described only one embodiment in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A locking rail for a motor vehicle seat, the motor vehicle seat including means for longitudinally and vertically adjusting the seat, a lever means pivotally connected to a seat frame of the adjusting means for operatively connecting the locking rail to an end of a vehicle safety belt system, and means provided on a lower free end of the lever means for lockingly engaging the lever means to the locking rail upon a predetermined tensile stress on the safety belt system being exceeded, characterized in that means are provided for rigidly securing the locking rail to an underframe of the motor vehicle seat and a floor of the vehicle, and in that means pivotally mounted on the lever means are provided for pivotally connecting the lever means to the seat frame so that a path traveled by a safety belt of the safety belt system during a longitudinal adjustment of the vehicle seat is maintained and only a slightly modified change in the path of the safety belt takes place during a vertical adjustment of the vehicle seat.

2. A locking rail according to claim 1, characterized in that said means for pivotally connecting the lever means to the seat frame includes a fishplate means having a first end pivotally mounted at the lever means and a second end pivotally mounted at the seat frame.

3. A locking rail according to one of claims 1 or 2, characterized in that the locking rail forms a structural unit with the underframe of the vehicle seat.

* * * * *